(12) United States Patent
You

(10) Patent No.: US 9,037,721 B2
(45) Date of Patent: *May 19, 2015

(54) METHOD AND SYSTEM FOR RESOURCE ADMISSION CONTROL

(75) Inventor: Jianjie You, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 338 days.

This patent is subject to a terminal disclaimer.

(21) Appl. No.: 12/995,675

(22) PCT Filed: Jun. 26, 2008

(86) PCT No.: PCT/CN2008/071453
§ 371 (c)(1),
(2), (4) Date: Dec. 2, 2010

(87) PCT Pub. No.: WO2009/146593
PCT Pub. Date: Dec. 10, 2009

(65) Prior Publication Data
US 2011/0145416 A1 Jun. 16, 2011

(30) Foreign Application Priority Data
Jun. 6, 2008 (CN) .......................... 2008 1 0067801

(51) Int. Cl.
*G06F 15/173* (2006.01)
*H04L 12/54* (2013.01)
(Continued)

(52) U.S. Cl.
CPC .......... *H04L 12/5695* (2013.01); *H04L 47/782* (2013.01); *H04L 47/805* (2013.01); *H04L 47/824* (2013.01)

(58) Field of Classification Search
USPC .......................................... 709/226; 370/230
See application file for complete search history.

(56) References Cited

U.S. PATENT DOCUMENTS 6,038,593 A * 3/2000 Huckins ........................ 709/217
8,249,236 B2   8/2012 Das et al.
(Continued)

FOREIGN PATENT DOCUMENTS

CN          1832447 A    9/2006
CN        101001402 A    7/2007
(Continued)

OTHER PUBLICATIONS

Ricardo Bandeira "Admission Control Function for Telecommunication Networks", Instituto Superior Tecnico, Universidade Tecnica de Lisboa, 2007.*
(Continued)

*Primary Examiner* — Vivek Srivastava
*Assistant Examiner* — Hien Doan
(74) *Attorney, Agent, or Firm* — Oppedahl Patent Law Firm LLC

(57) ABSTRACT

A method and system for resource admission control are disclosed. During a resource request process in the scenario of customer roaming, a visited location PD-FE sends a modified QoS policy or acceptable QoS policy information to a home location PD-FE when it cannot accept a resource request sent by the home location PD-FE, and the home location PD-FE makes a resource policy decision again and requests resources again according to the modified QoS policy, or when the home location PD-FE receives the next service request, it makes a resource policy decision according to the QoS policy information acceptable to the visited location PD-FE and sends a resource request to the visited location PD-FE. Both resource requests in the two cases are made based on the resource condition of the visited location PD-FE, therefore the visited location PD-FE generally can accept the requests after receiving them, thereby improving the success possibility of resource requests.

16 Claims, 7 Drawing Sheets

(51) Int. Cl.
*H04L 12/911* (2013.01)
*H04L 12/927* (2013.01)

(56) References Cited

U.S. PATENT DOCUMENTS

| | | | |
|---|---|---|---|
| 2004/0218607 A1 | 11/2004 | Hurtta | |
| 2006/0245426 A1* | 11/2006 | Rasanen | 370/389 |
| 2007/0002868 A1 | 1/2007 | Qian et al. | |
| 2007/0189274 A1 | 8/2007 | Liu | |
| 2007/0201513 A1* | 8/2007 | Anderson et al. | 370/468 |
| 2007/0220251 A1 | 9/2007 | Rosenberg et al. | |
| 2007/0249339 A1* | 10/2007 | Tamura et al. | 455/433 |
| 2008/0004027 A1 | 1/2008 | Chen et al. | |
| 2008/0049648 A1* | 2/2008 | Liu et al. | 370/310 |
| 2008/0068991 A1 | 3/2008 | Ponauswamy | |
| 2008/0259865 A1 | 10/2008 | Hurtta et al. | |
| 2010/0271943 A1* | 10/2010 | Wu et al. | 370/230 |

FOREIGN PATENT DOCUMENTS

| | | |
|---|---|---|
| CN | 101009697 A | 8/2007 |
| CN | 101060367 A | 10/2007 |
| CN | 101222432 A | 7/2008 |
| CN | 101247652 A | 8/2008 |
| EP | 1860825 A1 | 11/2007 |

OTHER PUBLICATIONS

International Search Report on international application No. PCT/CN2008/071453, mailed on Mar. 19, 2009.

English Translation of the Written Opinion of the International Search Authority in international application No. PCT/CN2008/071453, mailed on Mar. 19, 2009.

Notification of the First Office Action of Chinese application No. 200810067801.4, issued on Jun. 15, 2011.

Resource reservation in advance in heterogeneous networks with partial ATM infrastructures Apr. 7, 1997.

Adaptive connection admission control for differentiated services access networks Nov. 29, 2004.

Supplementary European Search Report in European application No. 08773061.0, mailed on Aug. 5, 2013.

English Translation of the Written Opinion of the International Search Authority in international application No. PCT/CN2009/074521, mailed on Apr. 8, 2010.

International Search Report in international application No. PCT/CN2009/074521, mailed on Apr. 8, 2010.

R. Yavatkar et al., Network Working Group, A Framework for Policy-based Admission Control, RFC 2753, Jan. 2000.

You Jianjie ZTE Corporation P R China: "Proposal to add the procedure for nomadicity scenario 2 in Y.RACF; C 178", ITU-T Draft; Study Period 2009-2012, International Telecommunication Union, Geneva; CH, vol. ngn-gsi ; 4/13, May 5, 2009, pp. 1-4, XP017566285.

Supplementary European Search Report in European application No. 09845947.2, mailed on Oct. 28, 2013.

Yavatkar et al., The Internet Society, Network Working Group, A Framework for Policy-based Admission Control, RFC 2753, Jan. 2000.

* cited by examiner

METHOD AND SYSTEM FOR RESOURCE ADMISSION CONTROL

TECHNICAL FIELD

The present invention relates to the field of communications, and in particular to a method and system for resource admission control in a roaming scenario.

BACKGROUND

Next generation network (NGN), which adopts IP and other packet technologies as a bearing network technology to merge fixed-line communications with mobile communications, is a hot research topic in the current field of communication standards. NGN can provide richer multimedia services which require a communication network to provide efficient end-to-end quality of service (QoS), such as emerging services having requirements on real time (e.g. video conferencing, multimedia distance learning and video on demand); meanwhile, the requirements of customers on the QoS of networks become higher and higher, therefore, how to provide end-to-end QoS becomes one of the core problems of NGN.

ITU-T is the telecommunication standardization sector of international telecommunication union (ITU) which defines standards for resource admission control. The functional frame of resource and admission control functions (RACF) is provided in the latest RACF draft released by ITU-T in May, 2008. As shown in FIG. 1, the RACF is composed of two parts which are a policy decision functional entity (PD-FE) and a transport resource control functional entity (TRC-FE).

The PD-FE, which relates to neither transmission technologies nor service control functions (SCF), makes a final decision on resource admission control according to a network policy rule, service information provided by the SCF, transport-layer subscription information provided by network attachment control functions (NACF) and a resource availability decision result provided by the TRC-FE.

The TRC-FE, which has no relationship with services but does with transmission technologies, takes charge of collecting and maintaining transmission network information and resource state information. After receiving a resource request from the PD-FE, the TRC-FE enforces resource-based admission control according to QoS, priority demands, resource availability information and transmission-related policy rules.

A transport layer consists of a policy enforcement functional entity (PE-FE) and a transport resource enforcement functional entity (TRE-FE). The PE-FE is a packet-to-packet gateway, which may be located between a customer premises network (CM) and an access network, between an access network and a core network, or between different operator networks and serves as a key node to support dynamic QoS control, port address translator control and network address translator (NAT) traversal. The TRE-FE enforces the transport resource policy rule distributed by the TRC-FE, with the range and the function thereof as well as an Rn interface remaining to be studied further, and the study is beyond the research range in R2 stage.

The PD-FE is a policy decision functional entity, which makes a preliminary QoS resource decision based on media stream session information (acquired from the SCF via an Rs interface) and the transport resource subscription information of a customer (acquired from NACF via an Ru interface), then interacts with the TRC-FE to determine whether there is enough QoS resource, and finally makes a final admission decision and distributes the admission decision to the PE-FE to be enforced.

The TRC-FE mainly takes charge of resource control, monitors resources in a network and collects related information, and makes a response according to specific resource condition when the PD-FE requests resources.

The PE-FE mainly carries out policy control (e.g. gate control, bandwidth, traffic classification and identification, traffic shaping, second-layer and third-layer QoS mapping and resource usage information collection and report) under the direction of the PD-FE.

A TRE-FE protocol is currently defined to implement a second-layer policy under the direction of the TRC-FE, with specific function and range undetermined.

In a roaming scenario, NGN is divided into a home network and a visited network. FIG. 2 is a diagram of RACF in a roaming scenario in existing technologies, in which a home location policy decision functional entity (PD-FE (H)) in a home network exchanges information with a visited location policy decision functional entity (PD-FE (V)) in a visited network via an Ri interface, and the SCF interacts with the PD-FE (H). A user equipment (UE) accesses the network at the visited location to request to use the SCF provided by the home location.

Currently, in a roaming scenario, the problem that how a PD-FE (H) in a home network cooperates and coordinates with a PD-FE (V) in a visited network to make a QoS policy remains to be solved.

FIG. 3 is a flowchart of resource admission control in a roaming scenario in existing technologies, including the following steps:

301, a UE initiates a service request and sends a request message to SCF to trigger the SCF to generate a resource initialization request;

302, the SCF sends a service request message to a PD-FE (H);

303, the PD-FE (H) first carries out an authorization check on the service request, including validating whether the requested QoS resource is accordant with a local operator policy rule and customer subscription information that is from NACF; if the authorization check is passed, the PD-FE (H) makes a resource policy decision on the service request message according to the customer subscription information, the local operator policy rule and so on, and generates a resource request message;

304, the PD-FE (H) sends a PD-FE (V) a resource request message in which QoS policy information made by the PD-FE (H) is contained;

305, the PD-FE (V) carries out an authorization check on the resource request, including determining whether the resource request is accordant with a local operator policy rule, if yes, the PD-FE (V) accepts the request and proceeds to the next step, otherwise, it rejects the request;

306, the PD-FE (V) interacts with a TRC-FE (V) to check resource availability information;

307, the PD-FE (V) makes a final resource admission decision according to the QoS policy information requested by the PD-FE (H), the resource availability information which is used as a response from the TRC-FE (V) and other information;

308, the PD-FE (V) distributes a policy rule to a PE-FE (V), and the PE-FE (V) performs a policy installation;

309, the PD-FE (V) sends a resource request response message to the PD-FE (H

310, the PD-FE (H) sends a service request response message to the SCF;

311, the SCF sends a service request response message to the UE.

In the step 305 of existing technologies, the PD-FE (V) passively processes the resource request message from the PD-FE (H), that is, since there is no negotiation mechanism between the PD-FE (V) and the PD-FE (H), the PD-FE (V) only accepts or rejects the resource request message, generally making no modification on the QoS policy information contained in the received resource request message, thus lowering the success possibility of resource requests.

SUMMARY

The present invention aims to provide a method and system for resource admission control, which adds a negotiation mechanism between a visited location PD-FE and a home location PD-FE, so as to improve the success possibility of resource requests.

In order to solve the above technical problem, the present invention provides a method for resource admission control, which comprises: during a resource request process in the scenario of customer roaming, after receiving a resource request message from a home location policy decision functional entity (PD-FE), a visited location PD-FE carries out an authorization check on the message, if the check is not passed, the visited location PD-FE feeds its acceptable quality of service (QoS) policy information or a modified QoS policy back to the home location PD-FE.

Further, before the visited location PD-FE receives the resource request message from the home location PD-FE, the method may further include:

the home location PD-FE may receive a service request message from service control functions (SCF), make a resource policy decision according to the service request message, a local operator policy and customer subscription information, and send the visited location PD-FE a resource request message in which a QoS policy made by the home location PD-FE is contained.

Further, after receiving a service request message from the SCF, the home location PD-FE may first carry out an authorization check on the service request message, if the check is passed, the home location PD-FE may make a resource policy decision and perform the step of sending a resource request message; if the check is not passed, the home location PD-FE may send a service request response message to the SCF to reject the service request.

Further, the process that the visited location PD-FE feeds its acceptable QoS policy information back to the home location PD-FE may be that: the visited location PD-FE may send the home location PD-FE a resource request rejection message in which the QoS policy information acceptable to the visited location PD-FE is contained, and after receiving the resource request rejection message, the home location PD-FE may send a service request response message to the SCF to reject the service request.

Further, after receiving the resource request rejection message from the visited location PD-FE, the home location PD-FE may further record the QoS policy information acceptable to the visited location PD-FE; after receiving the next service request message from the SCF, the home location PD-FE may make a resource policy decision according to the recorded QoS policy information acceptable to the visited location PD-FE, local operator policy information and customer subscription information, generate a resource request message, and send the resource request message to the visited location PD-FE.

Further, the process that the visited location PD-FE feeds a modified QoS policy back to the home location PD-FE may be that: the visited location PD-FE may modify the QoS policy in the resource request message according to a local operator policy, and send the home location PD-FE a resource request response message in which the modified QoS policy is contained.

Further, after receiving the resource request response message from the visited location PD-FE, the home location PD-FE may check whether the QoS policy modified by the visited location PD-FE is acceptable, if yes, the home location PD-FE may make a final resource policy decision according to the modified QoS policy, customer subscription information and a local operator policy, generate a final resource request message, and send the final resource request message to the visited location PD-FE to request resources; if no, the home location PD-FE may send a service request response message to the SCF to reject the service request.

Further, after receiving the final resource request message from the home location PD-FE, the visited location PD-FE may carry out an authorization check on the final resource request message, if the check is passed, the visited location PD-FE may perform the following steps:

interacting with a visited location transport resource control functional entity (TRC-FE) to check resource availability information;

making a final resource admission decision according to the QoS policy in the final resource request message and the resource availability information which is used as a response from the visited location TRC-FE;

distributing a policy rule to a visited location policy enforcement functional entity (PE-FE) which implements a policy installation; and sending a resource request response message to the home location PD-FE.

The present invention also provides a resource admission control system, which includes a home location PD-FE and a visited location PD-FE, wherein the home location PD-FE includes an information collecting module, a policy decision module and a policy negotiating module, the visited location PD-FE includes an authorization checking module, a policy feedback module and a resource admission decision module, wherein the information collecting module is used for receiving a service request message from SCF and acquiring customer subscription information and a local operator policy;

the policy decision module is used for making an initial resource policy decision according to the service request message received by the information collecting module and the acquired customer subscription information and local operator policy, and sending the authorization checking module of the visited location PD-FE a resource request message in which a QoS policy is contained;

the authorization checking module is used for carrying out an authorization check on the resource request message after receiving the resource request message from the policy decision module, sending a check failure message to the policy feedback module if the check is not passed, and sending a check success message to the resource admission decision module if the check is passed;

the policy feedback module is used for feeding QoS policy information acceptable to the visited location PD-FE or a modified QoS policy back to the policy negotiating module of the home location PD-FE after receiving the check failure massage from the authorization checking module;

the policy negotiating module is used for receiving and processing the QoS policy information acceptable to the visited location PD-FE or the modified QoS policy which is fed back by the policy feedback module; and the resource admission decision module is used for interacting with a visited location TRC-FE to make a resource admission decision after receiving the check success message.

Further, the process that the policy feedback module of the visited location PD-FE feeds QoS policy information acceptable to the visited location PD-FE back to the home location PD-FE may be that: the policy feedback module of the visited location PD-FE may send the home location PD-FE a resource request rejection message in which the QoS policy information acceptable to the visited location PD-FE is contained; and after receiving the QoS policy information acceptable to the visited location PD-FE from the policy feedback module, the policy negotiating module of the home location PD-FE may send a service request response message to the SCF to reject the service request.

Further, after receiving the QoS policy information acceptable to the visited location PD-FE from the policy feedback module, the policy negotiating module of the home location PD-FE may further send the QoS policy information acceptable to the visited location PD-FE to the information collecting module to be stored; and when processing the next service request, the policy decision module of the home location PD-FE may make a resource policy decision according to the recorded QoS policy information acceptable to the visited location PD-FE, a local operator policy information and customer subscription information, and send a resource request message to the visited location PD-FE.

Further, the process that the policy feedback module of the visited location PD-FE feeds a modified QoS policy back to the home location PD-FE may be that: the policy feedback module of the visited location PD-FE may modify the QoS policy in the resource request message according to a local operator policy and send the policy negotiating module of the home location PD-FE a resource request response message in which the modified QoS policy is contained; and after receiving the resource request response message from the policy feedback module, the policy negotiating module may check whether the modified QoS policy is acceptable, if yes, the policy negotiating module may make a final resource policy decision according to the modified QoS policy, customer subscription information and the local operator policy, generate a final resource request message and send the generated final resource request message to the visited location PD-FE to request resources; if no, the policy negotiating module may send a service request response message to the SCF to reject the service request.

The present invention has the following advantages: when a visited location PD-FE cannot receive a resource request from a home location PD-FE, it sends a modified QoS policy or its acceptable QoS policy information to the home location PD-FE, and the home location PD-FE makes a resource policy decision again according to the modified QoS policy and requests resources again, or when the home location PD-FE receives the next service request, it makes a resource policy decision by referring to the QoS policy information acceptable to the visited location PD-FE and sends a resource request to the visited location PD-FE. Both resource requests in the two cases are made based on the resource condition of the visited location PD-FE, therefore the visited location PD-FE generally can accept the resource requests after receiving them, thereby improving the success possibility of resource requests.

DETAILED DESCRIPTION

The present invention solves the problem of making an across-domain QoS policy decision in a roaming scenario by realizing an information interaction between a home location policy decision functional entity and a visited location policy decision functional entity. The method includes a negotiation process implemented between a visited location policy decision functional entity and a home location policy decision functional entity, aiming at a QoS policy: the visited location policy decision functional entity may modify the QoS policy from the home location policy decision functional entity according to its own local policy and feeds the modification result back to the home location policy decision functional entity, and the home location policy decision functional entity makes a final policy decision according to its own local policy and other information, i.e. rejecting or accepting the modification result; or the visited location policy decision functional entity feeds its acceptable QoS policy information back to the home location policy decision functional entity, so that the home location policy decision functional entity can make a policy decision by reference to the QoS policy information.

The present invention is described in detail in combination with the accompanying drawings and specific embodiments, so that those skilled in the art can sufficiently understand and implement the present invention, but it should be noted that the embodiments below are not limitations to the present invention.

Embodiment 1

Figure 1:
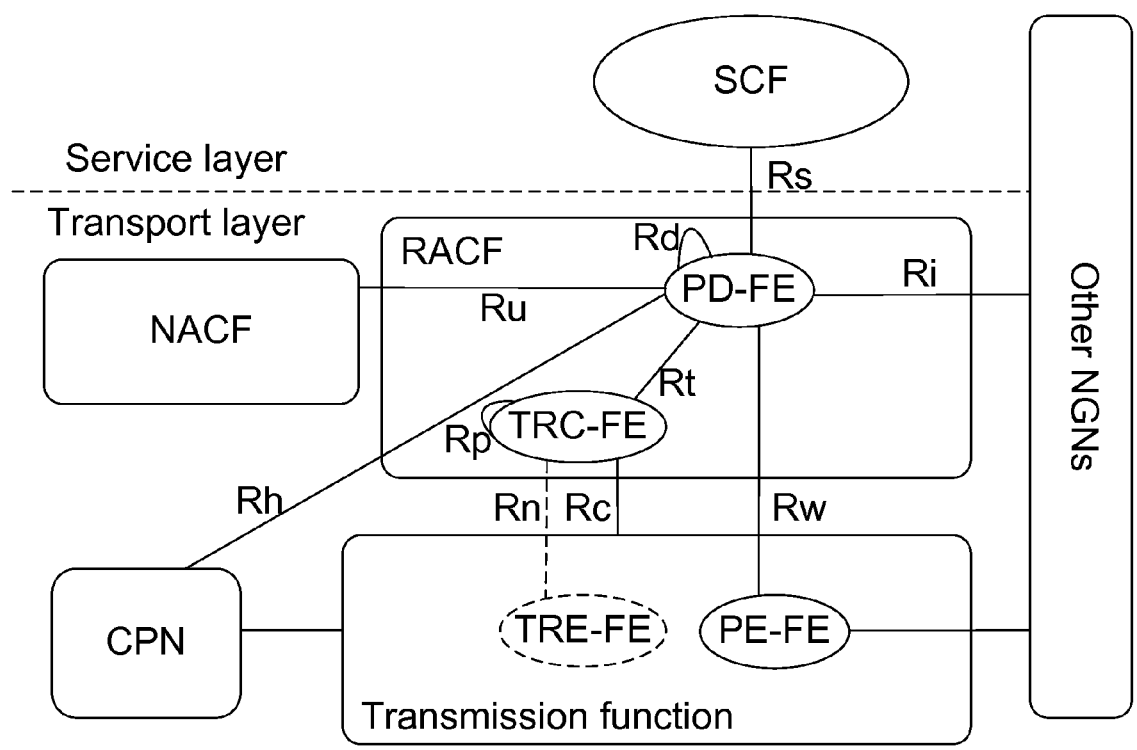
FIG. 1 is a diagram of the RACF functional architecture of ITU-T in existing technologies.
Figure 2:
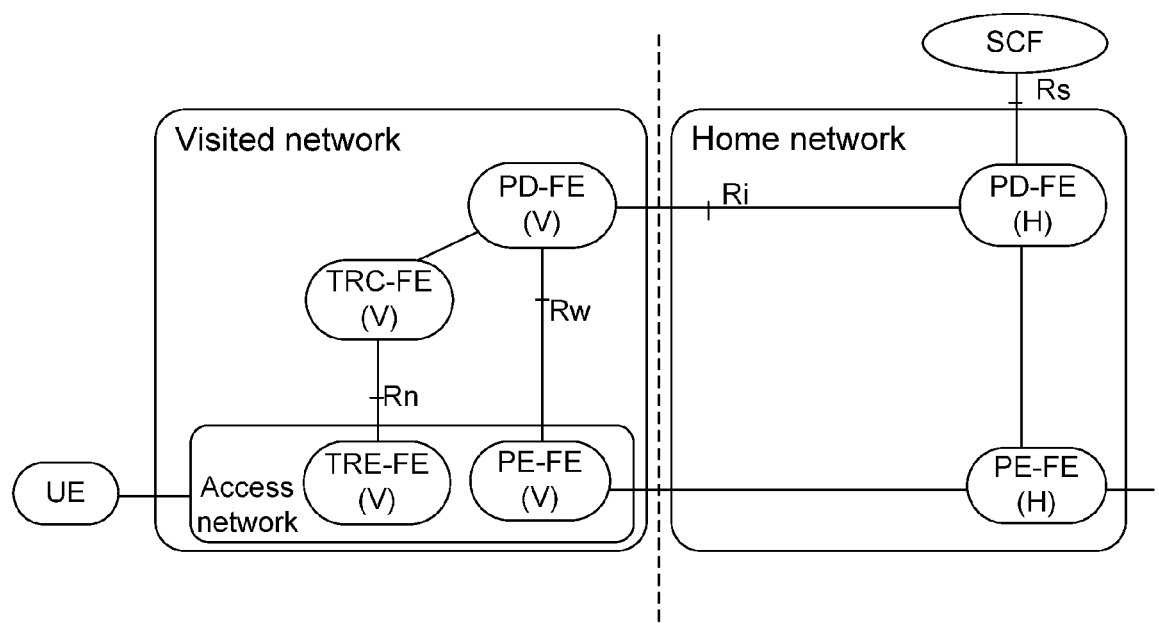
FIG. 2 is a diagram of RACF in a roaming scenario in existing technologies.
Figure 3:
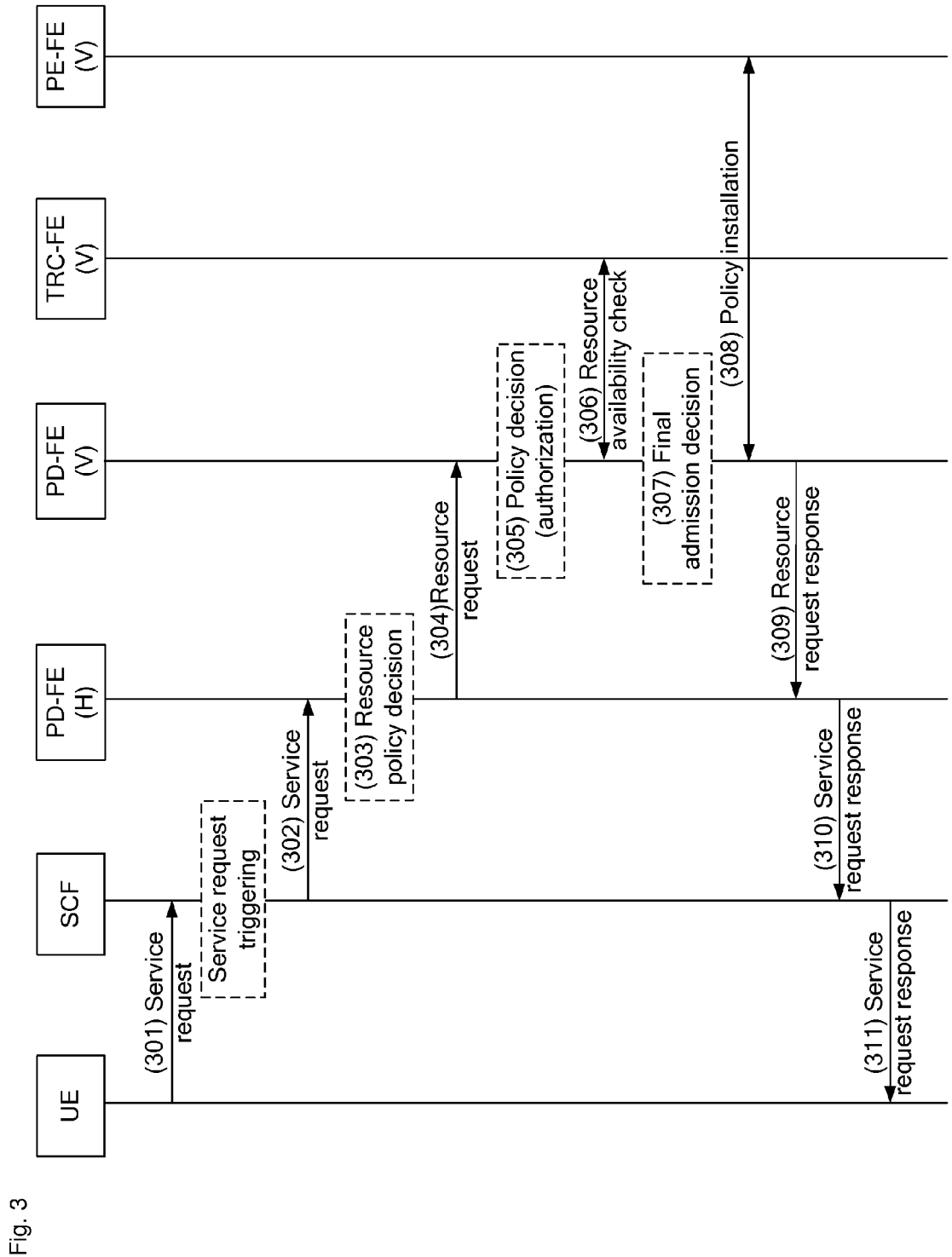
FIG. 3 is a flowchart of resource admission control in a roaming scenario in existing technologies.
Figure 4:
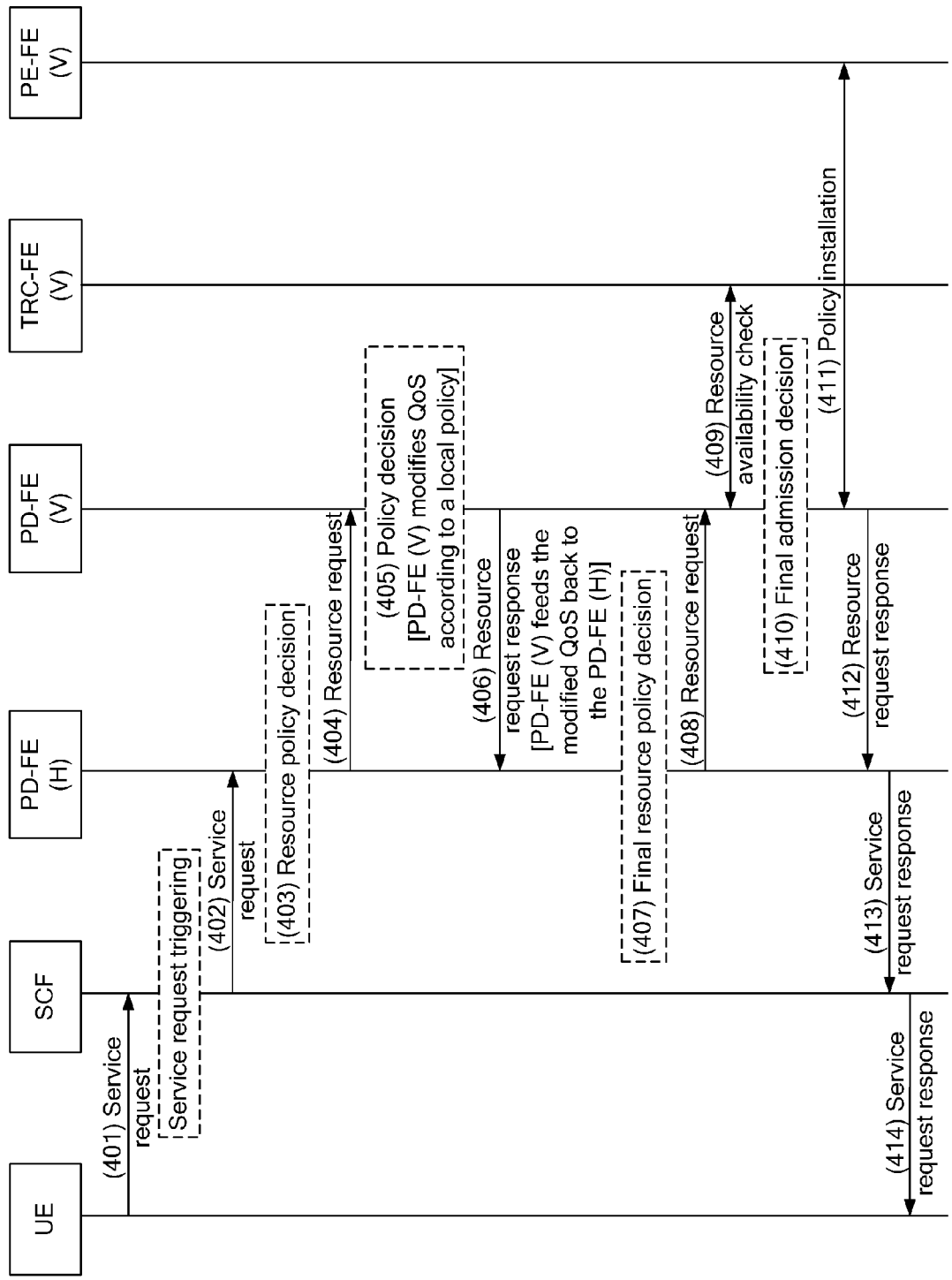
FIG. 4 is a flowchart of a resource request in a roaming scenario according to the first embodiment of the present invention.

FIG. 4 is a flowchart of a resource request in a roaming scenario according to the present invention; the resource request flow, which illustrates a negotiation process between a PD-FE (H) and a PD-FE (V) through an information interaction between the PD-FE (H) and the PD-FE (V), increasing the success possibility of resource requests, includes the following steps:

401, a UE initiates a service request and sends a request message to SCF to trigger the SCF to generate a resource initialization request;

402, the SCF sends a service request message to a PD-FE (H);

403, the PD-FE (H) first carries out an authorization check on the service request, including validating whether the requested QoS resource is accordant with a local operator policy rule and customer subscription information that is from NACF; if the authorization check is passed, the PD-FE (H) makes a resource policy decision on the service request message according to the customer subscription information, the local operator policy rule and so on; if the authorization check is not passed, the PD-FE (H) sends a service request response message to the SCF to reject the service request;

in this step, the PD-FE (H) interacts with the NACF to query the customer subscription information to validate whether the resource request in the service request message is accordant with the customer subscription information;

404, the PD-FE (H) sends a PD-FE (V) a resource request message in which a QoS policy made by the PD-FE (H) is contained;

405, the PD-FE (V) carries out an authorization check on the resource request, including validating whether the request is accordant with a local operator policy rule; if yes, the PD-FE (V) accepts the request and interacts with a TRC-FE (V) to make a resource admission decision; if no, the PD-FE (V) modifies the QoS policy in the resource request message based on the local operator policy rule;

406, the PD-FE (V) sends the PD-FE (H) a resource request response message in which the QoS policy modified by the PD-FE (V) is contained;

407, the PD-FE (H) makes a final resource policy decision according to the modified QoS policy fed back by the PD-FE (V), the customer subscription information and the local operator policy rule;

408, the PD-FE (H) sends the PD-FE (V) a resource request message in which a final QoS policy made by the PD-FE (H) is contained;

409, the PD-FE (V) interacts with the TRC-FE (V) to check resource availability information;

410, the PD-FE (V) makes a final resource admission decision according to the QoS policy requested by the PD-FE (H), the resource availability information which is used as a response from the TRC-FE (V) and other information;

411 the PD-FE (V) distributes a policy rule to a PE-FE (V) and the PE-FE (V) enforces a policy installation;

412, the PD-FE (V) sends a resource request response message to the PD-FE (H);

413, the PD-FE (H) sends a service request response message to the SCF; and 414, the SCF sends a service request response message to the UE.

Embodiment 2

Figure 5:
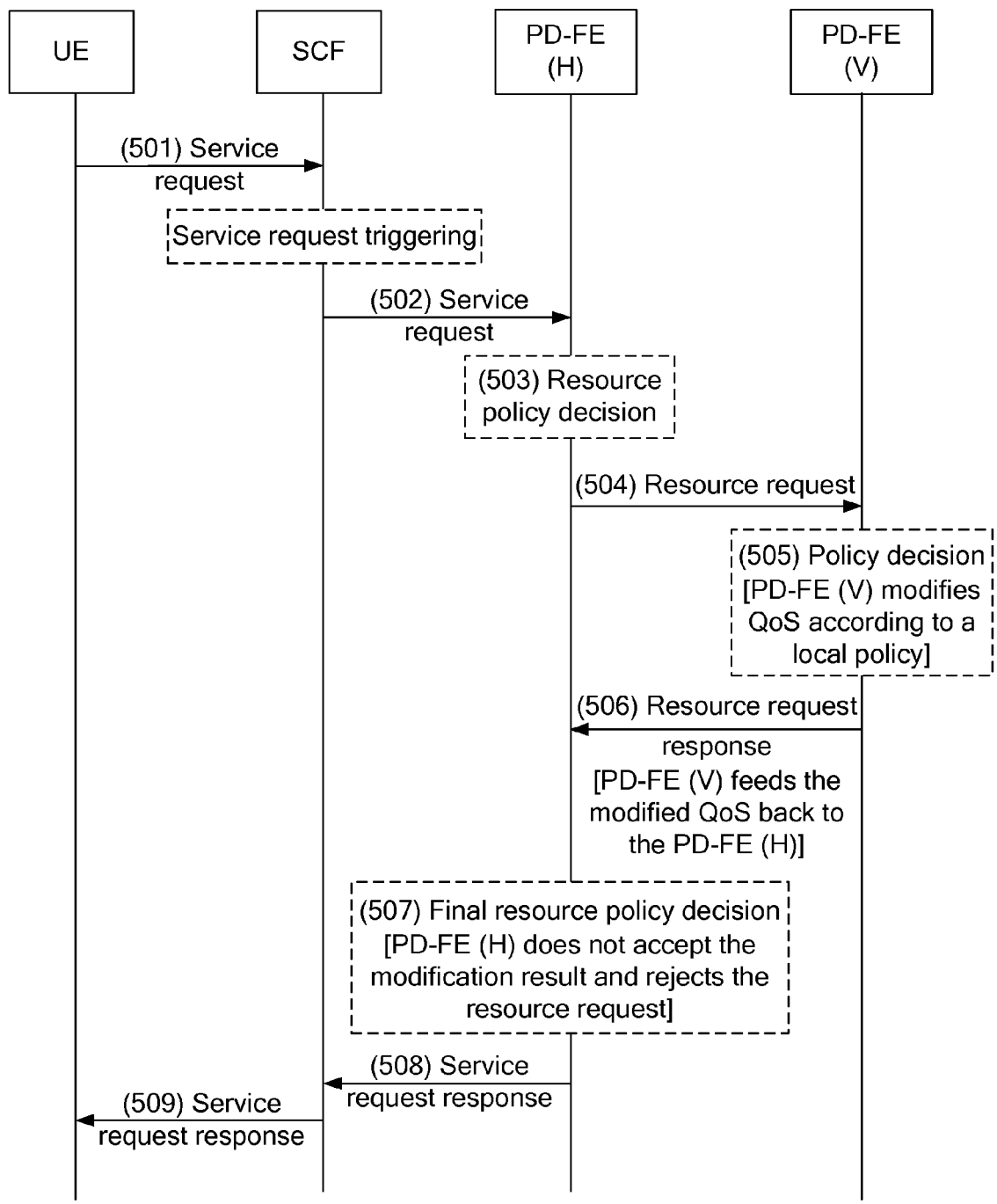
FIG. 5 is a flowchart of the rejection of a resource request by a home location in a roaming scenario according to the second embodiment of the present invention.

FIG. 5 is a flowchart of the rejection of a resource request by a PD-FE (H) in a roaming scenario according to the present invention; this flow, which illustrates a process that a PD-FE (V) modifies a QoS policy from a PD-FE (H) according to a local policy and feeds the modified QoS policy back to the PD-FE (H), but the PD-FE (H) does not accept the modification made by the PD-FE (V), includes the following steps:

501, a UE initiates a service request and sends a request message to SCF to trigger the SCF to generate a resource initialization request;

502, the SCF sends a service request message to a PD-FE (H);

503, the PD-FE (H) first carries out an authorization check on the service request, including validating whether the requested QoS resource is accordant with a local operator policy rule and customer subscription information that is from NACF; if the authorization check is passed, the PD-FE (H) makes a resource policy decision on the service request message according to the customer subscription information, the local operator policy rule and so on; if the authorization check is not passed, the PD-FE (H) sends a service request response message to the SCF to reject the service request;

in this step, the PD-FE (H) interacts with the NACF to query the customer subscription information to validate whether the resource request in the service request message is accordant with the customer subscription information;

504, the PD-FE (H) sends a PD-FE (V) a resource request message in which a QoS policy made by the PD-FE (H) is contained;

505, the PD-FE (V) carries out an authorization check on the resource request, including validating whether the request is accordant with a local operator policy rule; if yes, the PD-FE (V) accepts the request and interacts with a TRC-FE (V) to make a resource admission decision; if no, the PD-FE (V) modifies the QoS policy in the resource request message based on the local operator policy rule;

506, the PD-FE (V) sends the PD-FE (H) a resource request response message in which the QoS policy modified by the PD-FE (V) is contained;

507, the PD-FE (H) makes a final resource policy decision according to the modified QoS policy fed back by the PD-FE (V), the customer subscription information and the local operator policy rule, not accepting the modification made by the PD-FE (V) and rejecting the service request;

508, the PD-FE (H) sends a service request response message to the SCF; and 509, the SCF sends a service request response message to the UE.

Embodiment 3

Figure 6:
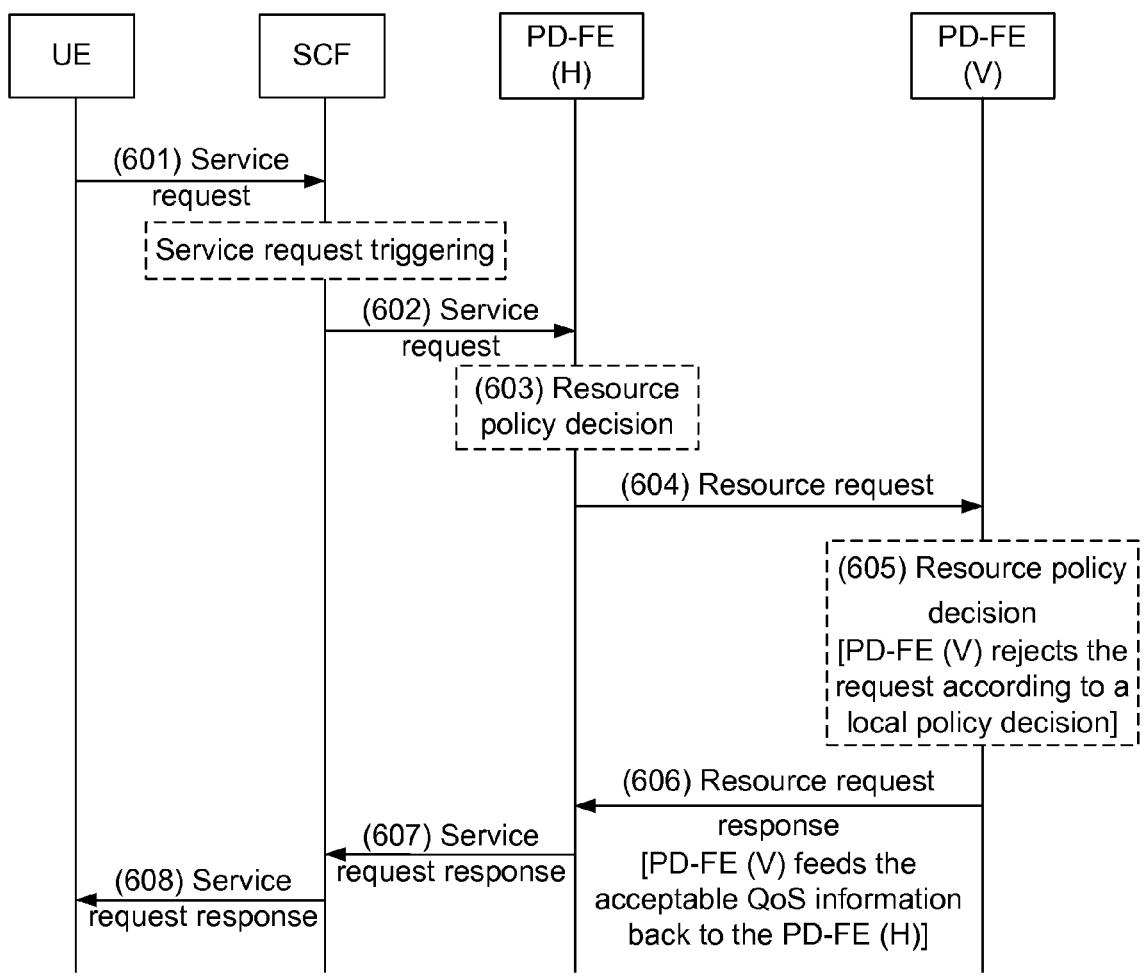
FIG. 6 is a flowchart of the rejection of a resource request by a visited location in a roaming scenario according to the third embodiment of the present invention.

FIG. 6 is a flowchart of the rejection of a resource request by a PD-FE (V) in a roaming scenario according to the present invention; this flow, which illustrates a process that a PD-FE (V) feeds its acceptable QoS policy information back to a PD-FE (H) after it rejects a resource request from the PD-FE (H), so as to improve the success possibility of initiating the next resource request by the PD-FE (H), includes the following steps:

601, a UE initiates a service request and sends a request message to SCF to trigger the SCF to generate a resource initialization request;

602, the SCF sends a service request message to a PD-FE (H);

603, the PD-FE (H) first carries out an authorization check on the service request, including validating whether the requested QoS resource is accordant with a local operator policy rule and customer subscription information that is from NACF; if the authorization check is passed, the PD-FE (H) makes a resource policy decision on the service request message according to the customer subscription information, the local operator policy rule and so on; if the authorization check is not passed, the PD-FE (H) sends a service request response message to the SCF to reject the service request;

in this step, the PD-FE (H) interacts with the NACF to query the customer subscription information to validate whether the resource request in the service request message is accordant with the customer subscription information;

604, the PD-FE (H) sends a PD-FE (V) a resource request message in which a QoS policy made by the PD-FE (H) is contained;

605, the PD-FE (V) carries out an authorization check on the resource request and determines not to accept the request according to a local operator policy rule;

606, the PD-FE (V) sends a resource request response message to the PD-FE (H) to reject the request, wherein QoS policy information acceptable to the PD-FE (V) is contained in the message;

607, the PD-FE (H) sends a service request response message to the SCF to reject the service request; and

608, the SCF sends a service request response message to the UE to reject the service request.

In the step 607, after receiving the resource request response message from the PD-FE (V), the PD-FE (H) may further record the QoS policy information acceptable to the PD-FE (V) contained in the response message. When the PD-FE (H) makes a resource policy decision after receiving the next service request message from the SCF, it makes the decision by referring to the recorded QoS policy information acceptable to the PD-FE (V) to make a resource request acceptable to the PD-FE (V), or when the PD-FE (H) cannot make a resource request satisfying the QoS policy acceptable to the PD-FE (V), it directly sends a service request response message to the SCF to reject the service request, thereby improving the success possibility and running efficiency of the resource request.

Figure 7:
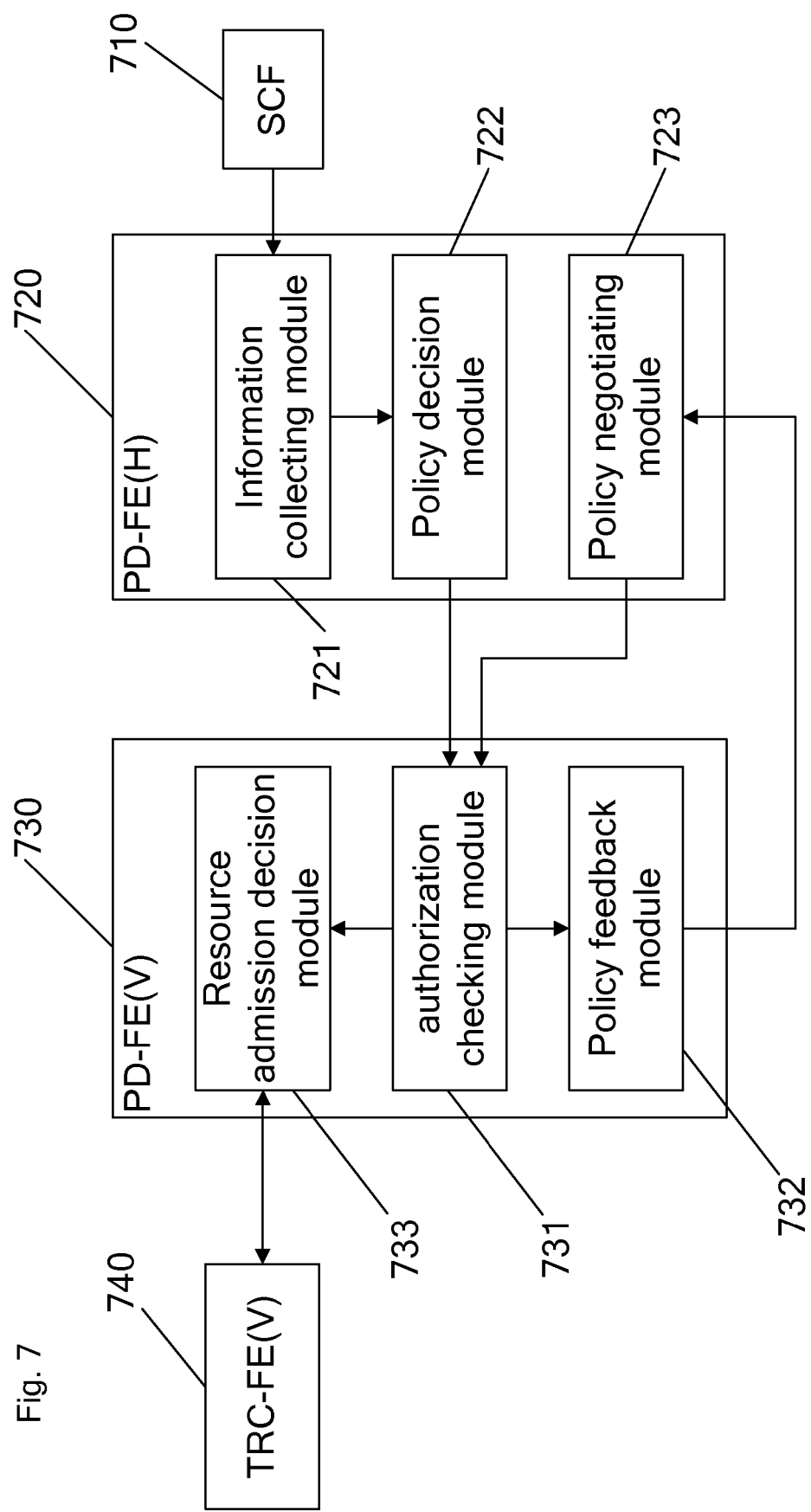
FIG. 7 is a structural diagram illustrating one embodiment of a resource admission control system of the present invention.

FIG. 7 is a structural diagram illustrating one embodiment of a resource admission control system of the present invention. As shown in FIG. 7, the system includes: a PD-FE (V) 730 which includes an authorization checking module 731, a policy feedback module 732 and a resource admission decision module; and a PD-FE (H) 720 which includes an information collecting module 721, a policy decision module 722 and a policy negotiating module 723; wherein the information collecting module 721 is used for receiving a service request message from SCF 710 and acquiring customer subscription information and a local operator policy;

the policy decision module 722 is used for making an initial resource policy decision according to the service request message received by the information collecting module 721 and the acquired customer subscription information and local operator policy, and sending the authorization checking module 731 of the PD-FE (V) 730 a resource request message in which an established QoS policy is contained;

the authorization checking module 731 is used for carrying out an authorization check on the resource request message after receiving the resource request message from the policy decision module 722, sending a check failure message to the policy feedback module 732 if the check is not passed, and sending a check success message to the resource admission decision module 733 if the check is passed;

the policy feedback module 732 is used for feeding QoS policy information acceptable to the PD-FE (V) 730 or a modified QoS policy back to the policy negotiating module 723 of the PD-FE (H) 720 after receiving the check failure massage from the authorization checking module 731;

the policy negotiating module 723 is used for receiving and processing the QoS policy information acceptable to the PD-FE (V) 730 or the modified QoS policy which is fed back by the policy feedback module 732; and the resource admission decision module 733 is used for interacting with a TRC-FE (V) 740 to make a resource admission decision after receiving the check success message.

Wherein the process that the policy feedback module 732 of the PD-FE (V) 730 feeds QoS policy information acceptable to the PD-FE (V) 730 back to the policy negotiating module 723 of the PD-FE (H) 720 is that: the policy feedback module 732 sends the policy negotiating module 723 a resource request rejection message in which the QoS policy information acceptable to the PD-FE (V) 730 is contained; after receiving the QoS policy information acceptable to the PD-FE (V) 730 from the policy feedback module 732, the policy negotiating module 723 sends a service request response message to the SCF 710 to reject the service request.

The process that the policy feedback module 732 of the PD-FE (V) 730 feeds a modified QoS policy back to the policy negotiating module 723 of the PD-FE (H) 720 is that: the policy feedback module 732 modifies the QoS policy in the resource request message according to the operator policy of the visited location, and sends the policy negotiating module 723 a resource request response message in which the modified QoS policy is contained; and after receiving the resource request response message from the policy feedback module 732, the policy negotiating module 723 checks whether the modified QoS policy contained in the message is acceptable, if yes, the policy negotiating module 723 makes a final resource policy decision according to the modified QoS policy, the customer subscription information and the local operator policy, and generates a final resource request message and sends the generated final resource request message to the PD-FE (V) 730 to request resources; if no, the policy negotiating module 723 sends a service request response message to the SCF 710 to reject the service request.

Further, after receiving the QoS policy information acceptable to the PD-FE (V) 730 from the policy feedback module 732, the policy negotiating module 723 sends the QoS policy information acceptable to the PD-FE(V) 730 to the information collecting module 721 to be stored; when the policy decision module 722 receives a service request again, it makes a resource policy decision according to the recorded QoS policy information acceptable to the PD-FE (V) 730, the local operator policy information and the customer subscription information, and sends the resource request message to the PD-FE (V) 730.

The present invention solves the problem of making an across-domain policy decision in a roaming scenario by realizing an information interaction between a PD-FE (H) and a PD-FE (V).

The above mentioned is only preferred embodiments for fully illustrating the present invention, but is not limitation to the present invention, it should be understood that the equivalent substitutes and variations devised by those skilled in the art based on the present invention shall be within the protection scope of the present invention, and the protection scope of the present invention shall be determined by the terms of the claims.

The invention claimed is:

1. A resource admission control system, including a home location Policy Decision Functional Entity (PD-FE) and a visited location PD-FE; the home location PD-FE further including an information collecting module, a policy decision module and a policy negotiating module, the visited location PD-FE further including an authorization checking module, a policy feedback module and a resource admission decision module, each of the information collecting module, the policy decision module, and the policy negotiating module comprising a first computer processor and respective memory, the respective memory storing computer-readable instructions which when executed by the first computer processor implement functions of the said modules;

each of the authorization checking module, the policy feedback module, and the resource admission decision module comprising a second computer processor and respective memory, the respective memory storing computer-readable instructions which when executed by the second computer processor implement functions of the said modules;

wherein the information collecting module being used for receiving a service request message from a Service Control Functions (SCF) and acquiring customer subscription information and a local operator policy;

the policy decision module being used for making an initial resource policy decision according to the service request message received by the information collecting module and the acquired customer subscription information and local operator policy, and sending via a transport layer the authorization checking module of the visited location PD-FE a resource request message in which a Quality of Service (QoS) policy is contained;

the authorization checking module being used for carrying out an authorization check on the resource request message after receiving the resource request message from the policy decision module, sending via the transport layer a check failure message to the policy feedback module if the check is not passed, and sending via the transport layer a check success message to the resource admission decision module if the check is passed;

the policy feedback module being used for feeding QoS policy information acceptable to the visited location PD-FE or a modified QoS policy via the transport layer back to the policy negotiating module of the home location PD-FE after receiving via the transport layer the check failure message from the authorization checking module;

the policy negotiating module being used for receiving and processing the QoS policy information acceptable to the visited location PD-FE or the modified QoS policy which is fed back by the policy feedback module; -and the resource admission decision module being used for interacting with a visited location Transport Resource Control Functional Entity (TRC-FE) to make a resource admission decision after receiving the check success message, wherein the home location PD-FE is configured to store the QoS policy acceptable to the visited location PD-FE, such that upon receiving a further service request message from the SCF, the home location PD-FE performs the following:

making a resource policy decision based on the stored QoS policy acceptable to the visited location PD-FE, the QoS policy acceptable to the visited location PD-FE being non-identical to the requested QoS policy; and sending a resource request message containing the QoS policy acceptable to the visited location PD-FE, to the visited location PD-FE; or if determining that no resource policy decision can be made to meet the stored QoS policy acceptable to the visited location PD-FE, directly sending a service request response message for rejecting the service request message to the SCF without interacting with the visited location PD-FE.

2. The system according to claim 1, wherein the process that the policy feedback module of the visited location PD-FE feeds QoS policy information acceptable to the visited location PD-FE back to the home location PD-FE is that: the policy feedback module of the visited location PD-FE sends the home location PD-FE a resource request rejection message in which the QoS policy information acceptable to the visited location PD-FE is contained; -and after receiving the QoS policy information acceptable to the visited location PD-FE from the policy feedback module, the policy negotiating module of the home location PD-FE sends a service request response message to the SCF to reject the service request message.

3. The system according to claim 2, wherein after receiving the QoS policy information acceptable to the visited location PD-FE from the policy feedback module, the policy negotiating module of the home location PD-FE further sends the QoS policy information acceptable to the visited location PD-FE to the information collecting module to be stored; -and when processing a next service request, the policy decision module of the home location PD-FE makes a resource policy decision according to the stored QoS policy information acceptable to the visited location PD-FE, a local operator policy information and customer subscription information, and sends a resource request message to the visited location PD-FE.

4. The system according to claim 1, wherein the process that the policy feedback module of the visited location PD-FE feeds a modified QoS policy back to the home location PD-FE is that: the policy feedback module of the visited location PD-FE modifies the QoS policy in the resource request message according to a local operator policy and sends the policy negotiating module of the home location PD-FE a resource request response message in which the modified QoS policy is contained; -and after receiving the resource request response message from the policy feedback module, the policy negotiating module checks whether the modified QoS policy is acceptable, if yes, the policy negotiating module makes a final resource policy decision according to the modified QoS policy, customer subscription information and the local operator policy, generates a final resource request message and sends the generated final resource request message to the visited location PD-FE to request resources; if no, the policy negotiating module sends a service request response message to the SCF to reject the service request message.

5. A method for resource admission control, comprising:

receiving a service request message from a Service Control Functions (SCF), by an information collecting module in a home location Policy Decision Functional Entity (PD-FE);

acquiring, customer subscription information and a local operator policy, by the information collecting module;

making an initial resource policy decision, by a policy decision module in the home location PD-FE, according to the service request message received by the information collecting module and the acquired customer subscription information and local operator policy;

sending, by the policy decision module via a transport layer, a first resource request message in which an initial Quality of Service (QoS) policy is contained to an authorization checking module of a visited location PD-FE;

performing an authorization check on the first resource request message by the authorization checking module after receiving the resource request message from the policy decision module based on an operator policy rule local to the visited location PD-FE;

sending, by the authorization checking module via the transport layer, a check success message to a resource admission decision module in the visited location PD-FE if the check is passed; or modifying the QoS policy in the first resource request message based on the operator policy rule when the authorization check on the first resource request is not passed, the check is not passed when the QoS policy acceptable to the visited location PD-FE being non-identical to the requested QoS policy;

sending, by the authorization checking module via the transport layer, a check failure message to a policy feedback module in the visited location PD-FE if the check is not passed;

sending, by the policy feedback module, a first resource request response message containing the modified QoS policy via the transport layer back to a policy negotiating module of the home location PD-FE after receiving via the transport layer the check failure message from the authorization checking module, the modified QoS policy being non-identical to the requested QoS policy;

receiving and processing the modified QoS policy by the policy negotiating module which is fed by the policy feedback module, and making, by the policy decision module, a final resource policy decision containing a final QoS policy based on the modified QoS policy;

sending within the transport layer a second resource request message containing the final QoS policy to the authorization checking module;

interacting, by the resource admission decision module in the visited location PD-FE, with a visited location Transport Resource Control Functional Entity (TRC-FE) to check resource availability information, and making a final resource admission decision based on the final QoS policy and the resource availability information;

distributing a policy rule corresponding to the final QoS policy to the resource admission decision module in the visited location PE-FE, which enforces a policy installation, and sending by the policy feedback module within the transport layer a second resource request response message for accepting the final QoS policy to the home location PD-FE; and sending within the transport layer, by the home location PD-FE, a service request response message for accepting the service request message to the SCF; and wherein the home location PD-FE is configured to store the QoS policy acceptable to the visited location PD-FE, such that upon receiving a further service request message from the SCF, the home location PD-FE performs the following:

making a resource policy decision based on the stored QoS policy acceptable to the visited location PD-FE, the QoS policy acceptable to the visited location PD-FE being non-identical to the requested QoS policy; and sending a resource request message containing the QoS policy acceptable to the visited location PD-FE, to the visited location PD-FE; or if determining that no resource policy decision can be made to meet the stored QoS policy acceptable to the visited location PD-FE, directly sending a service request response message for rejecting the service request message to the SCF without interacting with the visited location PD-FE;

wherein the home location PD-FE includes the information collecting module, the policy decision module and the policy negotiating module, each comprising a first computer processor and respective memory, the respective memory storing computer-readable instructions which when executed by the first computer processor implement functions of the said modules; and wherein the visited location PD-FE further includes the authorization checking module, the policy feedback module and the resource admission decision module, each comprising a second computer processor and respective memory, the respective memory storing computer-readable instructions which when executed by the second computer processor implement functions of the said modules.

6. The method according to claim 5, wherein the initial resource policy decision is made on the service request message according to an operator policy local to the home location PD-FE and customer subscription information, and wherein the performing the authorization check on the service request message comprises:

validating, by the home location PD-FE, whether requested resource in the service request message is accordant with the operator policy rule local to the home location PD-FE; and querying, by the home location PD-FE, the customer subscription information by interacting with a Network Attachment Control Functions (NACF), to validate whether the requested resource in the service request message is accordant with the customer subscription information.

7. The method according to claim 5, further comprising:
when the authorization check on the service request message is not passed, sending, by the home location PD-FE, a service request response message for rejecting the service request message to the SCF.

8. The method according to claim 5, further comprising:
when the authorization check on the first resource request is passed, interacting, by the visited location PD-FE, with the visited location TRC-FE to make the final resource admission decision.

9. A method for resource admission control, comprising:
receiving a first service request message from a Service Control Functions (SCF) by an information collecting module in a home location Policy Decision Functional Entity (PD-FE);

acquiring customer subscription information and a local operator policy by the information collecting module;

making a resource policy decision according to the first service request message received by the information collecting module and the acquired customer subscription information and local operator policy by a policy decision module in the home location PD-FE;

sending, by the policy decision module via a transport layer, a first resource request message in which a Quality of Service (QoS) policy is contained to an authorization checking module of a visited location PD-FE;

performing an authorization check on the first resource request message by the authorization checking module after receiving the resource request message from the policy decision module;

sending, by the authorization checking module via the transport layer, a check success message to a resource admission decision module in the visited location PD-FE if the check is passed; or sending, by the authorization checking module via the transport layer, a check failure message to a policy feedback module in the visited location PD-FE if the check is not passed, the check is not passed when the QoS policy acceptable to the visited location PD-FE being non-identical to the requested QoS policy;

feeding, by the policy feedback module, QoS policy information acceptable to the visited location PD-FE via the transport layer back to a policy negotiation module of the home location PD-FE after receiving via the transport layer the check failure message from the authorization checking module;

receiving and processing the QoS policy information acceptable to the visited location PD-FE by the policy negotiating module which is fed by the policy feedback module;

storing, by the information collecting module in the home network PD-FE, the QoS policy acceptable to the visited location PD-FE for further use;

sending, by the policy decision module, a first service request response message for rejecting the first service request to the SCF; and wherein the home location PD-FE includes the information collecting module, the policy decision module and the policy negotiating module, each comprising a first computer processor and respective memory, the respective memory storing computer-readable instructions which when executed by the first computer processor implement functions of the said modules;

wherein the visited location PD-FE further includes the authorization checking module, the policy feedback module and the resource admission decision module, each comprising a second computer processor and respective memory, the respective memory storing computer-readable instructions which when executed by the second computer processor implement functions of the said modules.

10. The method according to claim 9, further comprising:
after storing the QoS policy acceptable to the visited location PD-FE, upon receiving a second service request message from the SCF, making, by the home location PD-FE, a second resource policy decision based on the stored QoS policy acceptable to the visited location PD-FE, and sending a second resource request message containing the QoS policy acceptable to the visited location PD-FE, to the visited location PD-FE.

11. The method according to claim 9, further comprising:
after storing the QoS policy acceptable to the visited location PD-FE, upon receiving a second service request message from the SCF, determining, by the home location PD-FE, that no resource policy decision can be made to meet the stored QoS policy acceptable to the visited location PD-FE, and directly sending a service request response message for rejecting the service request message to the SCF without interacting with the visited location PD-FE.

12. The method according to claim 9, wherein the resource policy decision is made on the service request message according to an operator policy local to the home location PD-FE and customer subscription information, and
wherein the performing the authorization check on the first service request comprises:
validating, by the home location PD-FE, whether requested resource in the first service request message is accordant with a local operator policy rule; and
querying, by the home location PD-FE, the customer subscription information by interacting with a Network Attachment Control Functions (NACF), to validate whether the requested resource in the first service request message is accordant with the customer subscription information.

13. The method according to claim 9, further comprising:
when the authorization check on the service request message is not passed, sending, by the home location PD-FE, a service request response message for rejecting the service request message to the SCF.

14. The method according to claim 9, further comprising:
when the authorization check on the first resource request is passed, interacting, by the visited location PD-FE, with the visited location TRC-FE to make the final resource admission decision.

15. A method for resource admission control, comprising:
receiving a service request message from a Service Control Functions (SCF), by an information collecting module in a home location Policy Decision Functional Entity (PD-FE);

acquiring customer subscription information and a local operator policy, by the information collecting module;

making an initial resource policy decision according to the service request message received by the information collecting module and the acquired customer subscription information and local operator policy, by a policy decision module in the home location PD-FE;

sending, by the policy decision module via a transport layer, a resource request message in which an initial Quality of Service (QoS) policy is contained to an authorization checking module of a visited location PD-FE;

performing an authorization check on the resource request message by the authorization checking module after receiving the resource request message from the policy decision module;

sending, by the authorization checking module via the transport layer, a check success message to a resource admission decision module in the visited location PD-FE if the check is passed; or modifying the QoS policy in the resource request message based on a local operator policy rule when the authorization check on the first resource request is not passed, the check is not passed when the QoS policy acceptable to the visited location PD-FE being non-identical to the requested QoS policy;

sending, by the authorization checking module via the transport layer, a check failure message to a policy feedback module in the visited location PD-FE if the check is not passed;

sending, by the policy feedback module, the resource request response message containing the modified QoS policy via the transport layer back to a policy negotiating module of the home location PD-FE after receiving via the transport layer the check failure message from the authorization checking module, the modified QoS policy being non-identical to the requested QoS policy;

receiving and processing the modified QoS policy by the policy negotiating module which is fed by the policy feedback module, and making, by the policy decision module, a final resource policy decision of rejecting the modified QoS policy based on a local operator policy rule and customer subscription information;

sending via the transport layer a service request response message for rejecting the service request message to the SCF; and wherein the home location PD-FE is configured to store the QoS policy acceptable to the visited location PD-FE, such that upon receiving a further service request message from the SCF, the home location PD-FE performs the following:
making a resource policy decision based on the stored QoS policy acceptable to the visited location PD-FE, the QoS policy acceptable to the visited location PD-FE being non-identical to the requested QoS policy; and sending a resource request message containing the QoS policy acceptable to the visited location PD-FE, to the visited location PD-FE; or
if determining that no resource policy decision can be made to meet the stored QoS policy acceptable to the visited location PD-FE, directly sending a service request response message for rejecting the service request message to the SCF without interacting with the visited location PD-FE;

wherein the home location PD-FE includes the information collecting module, the policy decision module and the policy negotiating module, each comprising a first computer processor and respective memory, the respective memory storing computer-readable instructions which when executed by the first computer processor implement functions of the said modules; and wherein the visited location PD-FE further includes the authorization checking module, the policy feedback module and the resource admission decision module, each comprising a second computer processor and respective memory, the respective memory storing computer-readable instructions which when executed by the second computer processor implement functions of the said modules.

16. The method according to claim 15, wherein the performing the authorization check on the service request message comprises:

validating, by the home location PD-FE, whether requested resource in the service request message is accordant with a local operator policy rule; and querying, by the home location PD-FE, the customer subscription information by interacting with a Network Attachment Control Functions (NACF), to validate whether the requested resource in the service request message is accordant with the customer subscription information.

* * * * *